United States Patent [19]

Moore et al.

[11] Patent Number: 5,145,106

[45] Date of Patent: Sep. 8, 1992

[54] WELDING APPARATUS AND METHOD

[75] Inventors: Dean T. Moore, Strongsville; George F. Kub, Jr., Twinsburg; Kenneth A. Golonka, Sr., Richmond Heights, all of Ohio

[73] Assignee: Erico International Corporation, Cleveland, Ohio

[21] Appl. No.: 389,261

[22] Filed: Aug. 3, 1989

[51] Int. Cl.[5] ............................................. B23K 31/02
[52] U.S. Cl. ................................................. 228/241
[58] Field of Search ............... 228/241, 56.1; 266/167; 361/253, 247

[56] References Cited

U.S. PATENT DOCUMENTS

| | | | |
|---|---|---|---|
| 3,308,532 | 3/1967 | Long et al. | 228/241 |
| 3,325,316 | 6/1967 | MacDonald | 164/53 |
| 3,867,155 | 2/1975 | Davis et al. | 164/53 |
| 4,062,485 | 12/1977 | Andersen | 228/241 |
| 4,507,082 | 3/1985 | Wardlaw, III | 228/241 |
| 4,879,452 | 11/1989 | Kovarik et al. | 228/241 |
| 4,881,677 | 11/1989 | Amos et al. | 228/241 |
| 4,885,452 | 12/1989 | Amos et al. | 228/241 |

FOREIGN PATENT DOCUMENTS

| | | | |
|---|---|---|---|
| 0608930 | 11/1960 | Canada | 228/241 |
| 0544888 | 5/1942 | United Kingdom | 228/241 |

OTHER PUBLICATIONS

"Bonding and Joining Technology"Article, Exothermic Brazing Units. 1974. (NASA SP 5925(03) USGPO 1974).

*Primary Examiner*—Richard K. Seidel
*Assistant Examiner*—James Miner
*Attorney, Agent, or Firm*—Renner, Otto, Boisselle & Sklar

[57] ABSTRACT

A welding apparatus and method characterized by an electrically activated high temperature igniter with a pair of lead wires adapted to be connected to a high energy source of current and a high resistance bridge between the leads. The bridge is coated with an ignition material comprising a mixture of fine aluminum, one or more metal oxides or oxygen containing compounds and a binder. The welding apparatus has a vessel filled with exothermic material. When the lead wires are supplied with a high energy electrical current, the lead wires cause the ignition material to ignite in turn causing the exothermic material to ignite. If the coated bridge wire is positioned above the exothermic material, the igniter will broadcast multiple points of ignition over the top of the exothermic material.

26 Claims, 2 Drawing Sheets

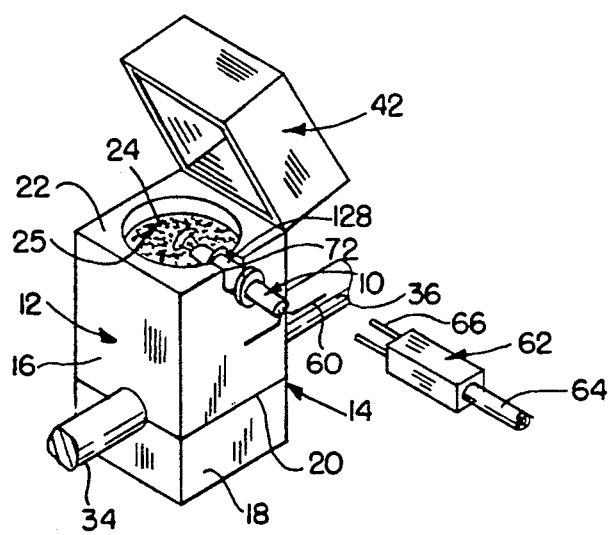
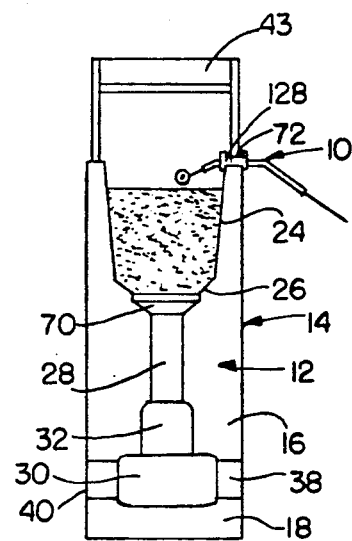
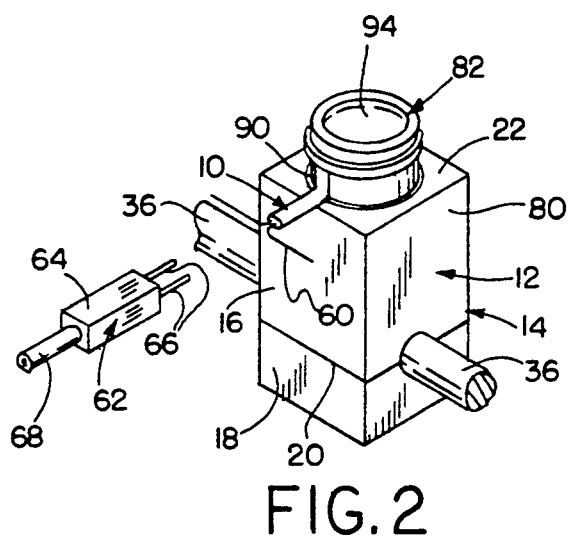
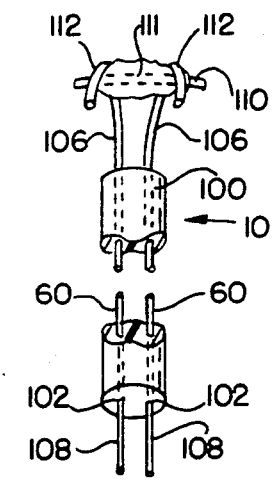
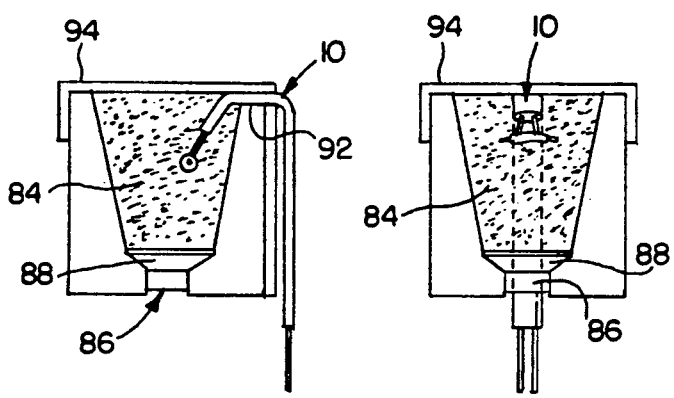
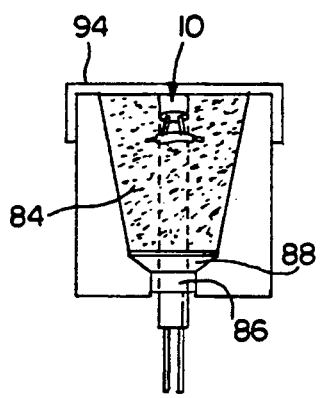
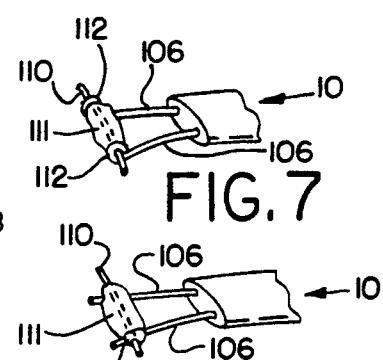

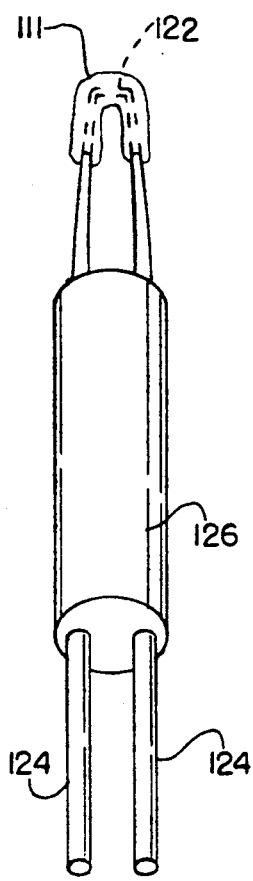
FIG. 9
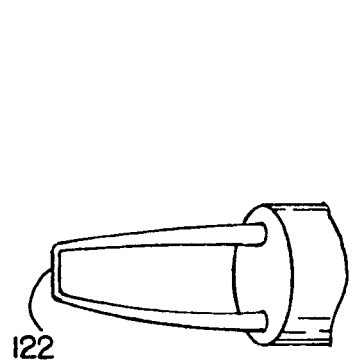
FIG. 10
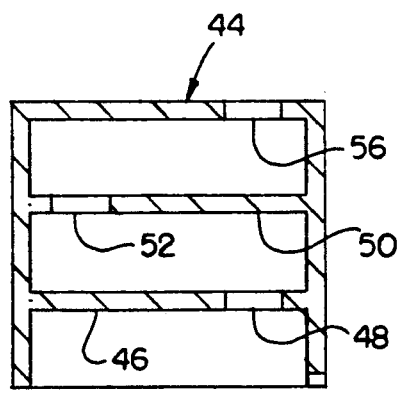
FIG. 12
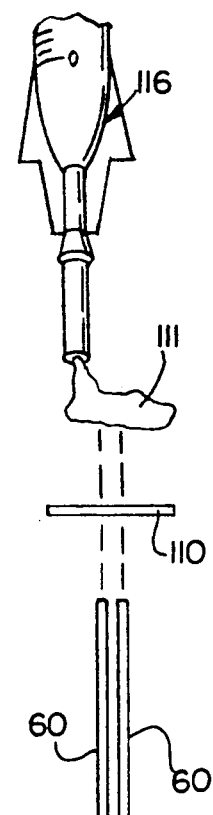
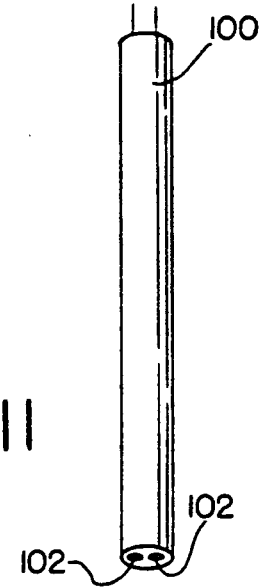
FIG. 11

WELDING APPARATUS AND METHOD

This invention relates generally as indicated to a welding apparatus and method and more particularly to an apparatus employing an electrically activated igniter which will not ignite unless a very high temperature is obtained.

BACKGROUND OF INVENTION

Igniters are necessary in many applications including the welding of parts using exothermic mixtures. A common way of making welds or joints is to provide a split graphite mold including a crucible and enclose in the mold the parts to be joined. The parts to be joined are first cleaned and placed appropriately in the graphite mold. The mold is then closed and locked and a metal disc is positioned in the crucible over the tap hole leading to the weld cavity in the mold. The necessary amount of exothermic material is then placed into the crucible section of the mold and a starting material, essentially a much finer exothermic mixture, is sprinkled over the top. The mold cover is then closed, and the starting material is ignited using a flint igniter. When the material is ignited, the molten metal formed separates from the slag, drops to the bottom of the crucible and melts the metal disc. The molten metal then drops through the tap hole, melts and joins the parts together. The molten metal is allowed to cool and the mold is opened. The slag material which stays above the weld in the crucible is separated from the weld or joint and the mold is cleaned for use on another connection. Some examples of welding apparatus are the CADWELD ® process and the THERMIT process. CADWELD is a trademark of Erico Products, Inc., Solon, Ohio, U.S.A. and THERMIT is a trademark of Th. Goldschmidt AG, Essen, W. Germany.

Exothermic mixtures consist of powdered metals, usually a transition metal oxide and a reductant metal, e.g. copper oxide and aluminum which upon ignition supplies enough heat to sustain and propagate a reaction within the mixture. The heat and/or products of this reaction is then used to produce a desired result. For example, the reaction between aluminum and copper oxide, in the CADWELD process, produces molten copper and aluminum oxide. The molten copper is of a higher density and is usually directed, by a mold, to join or weld copper or steel together. The aluminum oxide becomes slag and is broken off the weld or the joint and discarded.

Exothermic mixtures do not ignite spontaneously and a method of igniting this mixture is necessary to generate enough localized energy to permit the reaction to begin. Once the reaction has begun it becomes self-sustaining and requires no further energy to proceed to completion. Many combinations of transition metal oxides and reductant metals may react exothermically, depending on the conditions. The two most common mixtures are copper oxide with aluminum, and iron oxide with aluminum.

Some situations may require the remote ignition of the mixture. Also, the handling, shipping and preparatory process for the use of the starting material makes desirable an exothermic ignition process which would avoid the use of starting material. The development of filter systems such as shown in Brosnan et al application Ser. No. 128,597, filed Dec. 4, 1987 now U.S. Pat. No. 4,889,324, entitled "Exothermic Welding Apparatus And Method" may require remote ignition. Also, the development of self-contained welding packages such as those disclosed in the copending application of Kovaric et al entitled "Exothermic Welding Apparatus And Method", filed Apr. 4, 1988, Ser. No. 177,075 now U.S. Pat. No. 4,879,452, may cause the conventional ignition methods to be unworkable.

Exothermic materials may be ignited by a hot wire process, however such processes have several drawbacks. One of these drawbacks is reliability. In order for ignition to occur, the wire must transfer enough heat to the material before it fuses. If the wire fuses and ignition doesn't occur, the wire has to be replaced, reconnected and properly positioned in the exothermic material. Coils, lengths, or other patterns may be employed throughout the mixture such as seen in French patent specification 324,534 to Weber. However, because of the fusion of the wire, ignition, if it occurs at all, will normally occur only at a single point in the mixture. Single point ignition may be acceptable in some circumstances, however, to produce a quality weld multiple ignition points are necessary.

Other attempts at electrical ignition have been made, one utilizing highly esoteric and, of course, expensive solid rocket igniters such as shown in the copending application of Brosnan et al, Ser. No. 030,169 now abandoned. Such igniters operate at relatively low temperatures and are quite costly.

In a proper process, a delay occurs between ignition and the dropping of the molten metal into the weld chamber. Such delay results in completion of the reaction for all of the mixture and also permits any slag formed to rise to the top of the molten metal. Thus any slag formed will be drawn into the weld cavity last and will collect in a riser which may subsequently be removed. Thus if the disk melts through prematurely, slag or unreacted exothermic material or both may be drawn into the critical portion of the weld cavity, adversely affecting the quality of the weld.

It is therefore desirable to provide a reliable low cost remote electrical ignition system for exothermic materials which does not require starting material. Additionally it is desirable to provide an ignition which utilizes a lightweight and hand portable power source. Furthermore, an igniter preferably should not ignite at too low a temperature because of problems in shipping and handling. Still further, it is important that when the process is used to form welds, it is compatible with a system in which it is necessary for ignition to occur over the top surface of the mixture so that the problems noted above with single point ignition are avoided.

SUMMARY OF THE INVENTION

The present invention provides an improved igniter for igniting exothermic materials. When employed in a welding apparatus, the igniter may ignite exothermic materials remotely without damage to the quality or integrity of the weld or joint produced. The ignition may be produced by a lightweight and hand portable power source. Another significant advantage is the igniter will not ignite unless a very high temperature in excess of 1000° C. is reached. The igniter also may provide a shower of hot sparks which results in multiple ignition sites in the exothermic materials, thereby eliminating potential problems of unreacted material.

The igniter according to the present invention includes two lead wires which may be connected to a power source. The lead wires are tin coated, copper coated steel wires with a flame retardant, polyvinyl chloride (PVC) insulation. In the event that the insulation will see extreme heat, a ceramic coating may be employed. A high resistance, heating alloy, sized according to the power source, serves as a bridge wire and may be mechanically crimped or welded to two lead wires. An ignition material is coated onto the bridge wire.

An alternative to a separate bridge wire assembly may include a single, high resistance, heating alloy wire formed in a loop and inserted through a ceramic insulator. The center of the loop is attenuated or abraded slightly, either mechanically or chemically, and is coated with the ignition material.

In the illustrated embodiments the igniter is used as an ignition source for exothermic material in a welding apparatus. The igniter may be placed directly into the exothermic material, or may preferably be positioned above the material within the crucible of the mold holding the exothermic material and parts to be joined. The mold is covered and the lead wires are connected to the appropriate power source. The electrical connection is made and the exothermic material is ignited. The power source required is an electrical source of energy such as a high energy battery capable of bringing the bridge wire to a temperature in excess of 1000° C. within two seconds and transferring the heat into the applied ignition mixtures. This invention can be prepackaged into a "ready to use" self-contained weld metal package as described in the aforenoted copending patent application Ser. No. 177,075.

The materials that may be used for the bridge wire include Kanthal A-1, nickel chromium alloys, or any high resistance heating alloy wire. The ignition lead wires may be made of tinned copper coated steel, any 22-24 gauge steel, any 22-24 gauge copper, or any 22-24 gauge copper coated steel. The lead wire insulation may be made of polyvinyl chloride (PVC), ceramic, fiberglass, or any electrically and heat resistant material. The ignition material preferably may be composed of the following combination, (percents by weight): 21% aluminum (fine), 25% tin oxide (fine), 25% iron oxide (fine), 6% starch binder, and 23% water. However, acceptable material ranges for the ignition material, by percent weight, are: aluminum (fine) 20% to 26%, tin oxide (fine) 21% to 25%, and iron oxide (fine) 20% to 25%.

Other than the oxides noted, certain other oxygen containing compounds which are reducible by aluminum may be used, as long as the resultant reaction remains exothermic in nature and supplies enough heat to ignite the exothermic material, and yet has an ignition point of 1000° C. or higher.

The igniter of the present invention comprises these and other features hereinafter fully described and particularly pointed out in the claims, the following description and the annexed drawings setting forth in detail certain illustrative embodiments of the invention, these being indicative of but a few of the various ways in which the principles of the invention may be employed.

BRIEF DESCRIPTION OF THE DRAWINGS

In the annexed drawings:

FIG. 1 is a perspective view of welding apparatus with an igniter according to the present invention as used in a welding mold;

FIG. 2 is a similar perspective view of another form of welding apparatus and the igniter, such being a self-contained and sealed package of exothermic welding material;

FIG. 3 is a vertical section through a welding mold using a filter system;

FIG. 4 is a somewhat enlarged vertical section of a self-contained and sealed package of exothermic welding material such as seen in FIG. 2;

FIG. 5 is another vertical section of the package of FIG. 4 turned 90°;

FIG. 6 is an enlarged elevation fragmentary view of one igniter embodiment of the present invention;

FIG. 7 is a perspective view of the igniter of FIG. 6;

FIG. 8 is a perspective view of an alternative embodiment of the invention;

FIG. 9 is an enlarged perspective view of another embodiment of the present invention;

FIG. 10 is a view of the igniter tip without the igniter material;

FIG. 11 is an exploded perspective view of the materials and process used to make the present invention; and FIG. 12 is a vertical section view of an alternative baffle cover for the welding apparatus.

DETAILED DESCRIPTION OF THE INVENTION

Referring now to the annexed drawings, and more particularly to FIGS. 1, 2 and 3, an igniter designated generally at 10 is shown in a welding apparatus 12. The welding apparatus 12 includes a refractory mold assembly 14, which is preferably made of molded or machined graphite, or any other material which is capable of containing molten metals and the high heat of the exothermic reaction. The refractory mold 14 includes an upper part 16 which may include two vertically split parts and a lower part 18. The parts of the mold may be assembled as indicated at the facing parting line 20 and held together by suitable clamps, not shown.

The upper part 16 includes a top surface 22 with a generally cylindrical recess forming a crucible 24. The crucible 24 contains the exothermic material 25 and has a bottom annular horizontal surface 26. A tap hole 28 extends from the bottom surface 26 to a weld cavity 30. The weld cavity 30 may include an enlarged top portion or slag cavity 32. The parts desired to be joined by the welding apparatus are indicated at 34 and 36 and fit closely within two openings seen at 38 and 40 formed in the opposed faces of the mold parts 14 and 16. When positioned properly, the parts 34 and 36 project into the weld cavity 30.

As indicated in FIGS. 1 and 3, the welding apparatus includes a cover shown generally at 42 hinged to the top of the mold 14 and forming a relatively sizeable chamber when closed. The hinged cover 42 may include a two part filter system 43 designed to resist molten metal splatter from the exothermic reaction which takes place in the chamber below and filter and contain resultant combustion gases. Reference may be had to the aforenoted copending application of Dennis Brosnan et al Ser. No. 030,169, filed Mar. 25, 1987, entitled "Exothermic Welding Apparatus and Method", for a more complete description of the filter assembly which may be employed. Alternatively, the hinged cover may include simply holes in the top or a baffle system 44 as shown in FIG. 12. The baffle assembly as seen in FIG. 12 includes a first interior wall 46 or baffle plate which includes an offset opening 48. A second baffle plate 50 positioned above the first baffle plate has an oppositely offset opening 52. The top of the cover 54 also forms a baffle plate which has an oppositely offset opening 56.

Igniter 10 has lead wires 60 on the exterior of the welding mold which may be splayed or bent to extend in opposite directions. This permits the ready connection of a high energy source of current to the lead wires 60 such as through a connector, shown generally at 62 in FIGS. 1 and 2. The connector includes a rigid wand 64 having a pair of projecting electrodes 66 which are connected through the wand to a high energy source of current.

FIGS. 1 and 3 show one form of the welding apparatus 12. A metal disk 70 is positioned above the tap hole 28 in the bottom of the crucible and the exothermic material positioned on top. The upper part 16 includes a radial slot 72 in the top surface extending from the exterior of the apparatus 12 to the crucible 24. In FIGS. 2, 4 and 5, an alternate form of a welding apparatus 80 is illustrated. The igniter 10 is contained in a sealed package or container 82 of exothermic welding material 84 adapted to be converted to molten metal and slag upon ignition. The bottom of the container 82 includes a tap hole 86, the lower end of which is closed with a cup shaped heat consumable disk 88. The igniter 10 extends along an axial groove 90 in the exterior of the container and through a radial groove 92 in the lip of the container beneath the cap 94. When the exothermic material 84 is ignited, the heat causes the package cap 94 to be consumed. The heat consumable cap 94 for the package is preferably copper foil. A detailed disclosure of such self-contained package is contained in the co-pending application of Kovaric et al, Ser. No. 177,075, filed Apr. 4, 1988, noted before.

Referring now additionally to FIGS. 6-11, details of the igniter according to the present invention are illustrated. The igniter comprises the two lead wires 60, preferably tinned copper coated steel lead wires. Other examples of useful lead wires include any 22 to 24 gauge steel, any 22 to 24 gauge copper or any 22 to 24 gauge copper coated steel.

The lead wires 60 are inserted through a generally tubular insulator 100. The insulator 100 is preferably made from a flame-retardant polyvinylchloride (PVC). Ceramic, fiberglass or any electrically and heat resistant materials are useful for the insulator 100. The insulator 100 has two cylindrical passageways 104 through which the lead wires 60 are inserted. The lead wires 60 are necessarily longer than the insulator 102 so that a portion of each of the lead wires is exposed at each end of the insulator. Specifically, the lead wires 60 may be designated as having ignition ends 106 and connection ends 108.

A short bridge wire 110 spans the space between the lead wires at their ignition ends 106. The bridge wire 110 is preferably made of any high resistance heating alloys, such as Kanthal-A1, nichrome, or stainless steel and is coated with an ignition material 111 comprising a mixture of finely divided metal, one or more metal oxides and a binder.

The finely divided metal may be aluminum fines below 140 mesh, and the binder may include starch. The metal oxide may be selected from a group consisting of tin oxide fines, copper and iron oxide fines, and mixtures thereof. Water is included in the mixture to form a paste, and the mixture is dried after coating the bridge wire to remove the water. Preferably the ignition material coating 111 is made from a weight percentage mixture of from about 20 to about 26 percent aluminum fines, from about 21 to about 25 percent tin oxide fines, from about 20 to about 25 percent iron oxide fines, about 6 percent binder (starch) and about 23 percent water. Even more preferably, the percentage weight of the aluminum is about 21 percent, the tin oxide about 25 percent and the iron oxide about 25 percent.

Any oxygen containing compound, i.e. sulfates, nitrates, peroxides, etc., reducible by aluminum, while keeping the resultant reaction exothermic in nature, yet supplying enough heat to ignite the exothermic material may be used, as long as the mixture maintains an ignition point of 1000° C. or higher.

One example of such a mixture is:
17.5% copper scale fines (essentially $Cu_2O$)
28.3% $CaSO_4$ (calcium sulfate)
31.5% aluminum
5.2 binder (starch)
17.5% water.

Another example is:
22.6% manganese dioxide
30.2% aluminum
24.0% tin oxide
5.7% binder (starch)
17.5% water The bridge wire 110, with coated ignition material 111, is mechanically crimped to the lead wires 60 as shown as 112 in FIGS. 6 and 7. Alternatively, an igniter is shown in FIG. 8 in which the mechanical crimping is replaced by spot welds 114 securing the bridge wire 110 to the lead wire ignition ends 106. If the igniter is spot welded, the lead wires 60 may be plated to prevent rust.

FIG. 11 illustrates an exploded view of material used to make the igniter 10. The lead wires 60 are inserted into the insulator 100 through tubular passageways 102. The bridge wire 110 is then secured to the ignition ends 106 of the lead wires by crimping, welding or other suitable method. A syringe or gun 116 is used to extrude ignition material 111 onto the bridge wire 110.

In the alternative form illustrated in FIG. 9, the igniter has a single high resistance heating alloy wire 120. In this form nichrome wire may be used throughout the igniter. The wire 120 is bent to form a loop 122 and two connection ends 124. The connection ends 124 are inserted through and extended beyond a tubular insulator 126. The insulator 126 is similar to the insulator 102 of the previous embodiments, having two cylindrical openings, however the preferred material of the insulator 126 is ceramic. The center of the loop 122 is abraded slightly, either mechanically or chemically. The purpose of this abrading is to reduce cross section and increase resistance. Alternatively one may roll thread the wire 120 to reduce its cross sectional area at the loop 122. Ignition material 111 is then applied to the loop 122.

Referring back to FIGS. 1-5, the lead wires 60 of the igniter 10 extend from outside the mold 14 to the interior of the mold 14. The igniter 10 is shown positioned above the exothermic material 25 in FIGS. 1 and 3, and placed directly in the exothermic material 84 in FIGS. 4 and 5. The self-contained package 82 of FIG. 2 may incorporate either variation, depending on the amount of exothermic material 84 contained in the package. In FIGS. 1 and 3 a spool shape ceramic insulator 128 surrounds a portion of insulation and is cradled in the slot 22. The ceramic insulator 128 helps prevent slippage of the igniter from its position.

After the components are assembled, to begin the exothermic welding process, the rigid wand 64 is moved so that electrodes 66 contact the connection ends 106 of the splayed lead wires 60, supplying a high energy electrical current to the lead wires. High energy current is thereby impressed across the bridge wire 110 to ignite the igniter material 111. If the igniter material 111 is positioned above the exothermic material, the igniter 10 goes off like a sparkler. A shower of sparks or high temperature metal droplets are released, whereby the igniter broadcasts multiple points of ignition over the top of the exothermic material.

The ignition of the exothermic material produces weld or molten metal. The heat from the molten metal then causes the disk 70 to melt or fuse permitting the molten metal to drop through the tap hole 28 and into the weld cavity 30. Slag formed in the process rises to the top to be drawn through tap hole 28 to be collected in the slag cavity 32. When the weld connection cools sufficiently, the mold 14 is opened and the weld parts 34 and 36 removed.

The effluent from the reaction products of the exothermic mixture will exit from the hinged cover 42. In the filter system illustrated in FIG. 3, the filter assembly 43 will substantially contain the smoke, spume and spatter which will normally accompany an exothermic process or exothermic welding. If the baffle system 44 illustrated in FIG. 12 is used, the effluent from the reaction products will travel first through opening 48, then through opening 52 and finally exit the apparatus 12 through opening 56. The baffling and delay of the discharge of the effluent has been found to reduce the amount of smoke which is created.

Some examples of tests performed on the igniter of the present invention illustrate some of its important parameters. Ignition was produced with a DC current supplied by a 6 volt 10 amp-hour battery. To check the strength of the ignition material against abrasion from the exothermic material, that may occur with handling, ten (10) expandable packages were assembled within the bridge wire igniter for the ignition source. Five (5) were filled only half way with exothermic material, and five (5) were totally filled to simulate an unburied and a buried igniter respectively. All of the packages were subjected to violent shaking for twenty (20) minutes and were then tested for igniter integrity and ignition. No abrasion or loss of ignition material was observed and all packages ignited easily and successfully.

Another experiment was conducted to check the ignition material for possible problems with moisture gain. Five (5) bridge wire igniters were assembled and exposed to 100% humidity at 60° C. After seventy-two (72) hours no moisture gain was recorded and all igniters were successfully used to ignite exothermic material.

The ignition temperature of the material was tested to see how easily the ignition material will ignite, and how quickly the reaction would propagate if ignited. A flame test was conducted on a runner, 10 mm deep, 20 mm wide, and 250 mm long, of the ignition material. The flame, measured at 1050° C. one-eighth of an inch in front of the ignition material, was held to one end of the runner of material. After a time elapse of five minutes no ignition occurred, despite the red hot glow of the material. An additional test was conducted using a Lindberg oven at 1012° C. The material remained in the oven for ninety (90) minutes, and the same results were observed.

Although the invention has been shown and described with respect to certain preferred embodiments, equivalent alterations and modifications will be obvious to others skilled in the art upon the reading and understanding of this specification. The present invention includes all such equivalent alterations and modifications, and is limited only by the scope of the following claims.

What is claimed is:

1. Exothermic welding apparatus comprising a vessel containing an exothermic material adapted to be converted to molten metal and slag upon ignition, an electrical igniter for igniting said exothermic material comprising a pair of leads extending into said vessel, said leads being connected by a high resistance bridge, said bridge being coated with an ignition material having an ignition temperature in excess of 1000° C., and means to supply a high energy electrical current to said leads to cause said ignition material to ignite and in turn to cause said exothermic material to ignite.

2. In combination, a vessel containing exothermic material and an electrical igniter for igniting said exothermic material comprising a high resistance bridge wire coated with a high temperature ignition material having an ignition temperature in excess of 1000° C. whereby when a high energy current is impressed across said bridge wire to ignite said ignition material, the ignition material will in turn ignite said exothermic material.

3. The combination set forth in claim 2 including a welding chamber containing parts to be welded, the ingition of said exothermic material producing weld metal which drops into said weld chamber to weld said parts together.

4. The combination set forth in claim 3 wherein said bridge wire extends between the end of a pair of leads which extend from outside said vessel to the interior of said vessel.

5. The combination set forth in claim 4 wherein said leads outside said vessel are splayed, and a rigid wand having a pair of electrodes connected to a source of said high energy current adapted to contact said splayed leads.

6. The combination set forth in claim 4 including a cover on said vessel.

7. The combination set forth in claim 6 wherein said leads extend through said cover.

8. The combination set forth in claim 6 including a high temperature insulator for said leads.

9. The combination set forth in claim 2 wherein said coated bridge wire is embedded in said exothermic material.

10. The combination set forth in claim 2 wherein said coated bridge wire is above said exothermic material whereby when said ignition material ignites it broadcasts multiple points of ignition over the top of said exothermic material.

11. The combination set forth in claim 2 including a filter assembly over the top of said vessel.

12. The combination set forth in claim 2 including a baffle assembly on said vessel.

13. The combination set forth in claim 2 wherein said ignition material comprises a mixture of finely divided metal, a metal oxide and a binder.

14. The combination set forth in claim 13 wherein said metal is aluminum.

15. The combination set forth in claim 13 wherein said metal oxide is selected from a group consisting of tin oxide, copper oxide and iron oxide and mixtures thereof.

16. The combination set forth in claim 15 wherein said binder is starch.

17. The combination set forth in claim 2 wherein said ignition material comprises a mixture of aluminum fines below 140 mesh, tin oxide, iron oxide and a binder.

18. The combination set forth in claim 2 wherein said ignition material is made from a mixture of aluminum, tin oxide, iron oxide, a binder and water.

19. The combination set forth in claim 2 wherein said ignition material is made from a mixture, said mixture comprising in weight percent from about 20 to about 26% aluminum fines, from about 21 to about 25% tin oxide fines, from about 20 to about 25% iron oxide fines, about 6% binder and about 23% water.

20. The combination set forth in claim 19 wherein in said mixture the percentage by weight of the aluminum is about 21%, the tin oxide about 25%, and the iron oxide about 25%.

21. The combination set forth in claim 19 wherein such mixture is dried after coating the bridge wire to remove the water.

22. The combination set forth in claim 21 wherein said binder is starch.

23. The combination set forth in claim 19 wherein said aluminum fines are below 140 mesh.

24. The combination set forth in claim 2 wherein said ignition material has an ignition temperature in excess of 1100° C.

25. The combination set forth in claim 2 wherein said ignition material is made from a mixture of aluminum, calcium sulfate, copper oxide, a binder and water.

26. The combination set forth in claim 2 wherein said ignition material is made from a mixture of aluminum, manganese dioxide, tin oxide, a binder and water.

* * * * *